United States Patent [19]
Shiga

[11] Patent Number: 6,144,369
[45] Date of Patent: Nov. 7, 2000

[54] SIGNAL PROCESSING SYSTEM

[75] Inventor: Sadakazu Shiga, Fukushima-ken, Japan

[73] Assignee: Alps Electric Co., Ltd., Japan

[21] Appl. No.: 09/085,282

[22] Filed: May 27, 1998

[30] Foreign Application Priority Data

May 28, 1997 [JP] Japan ..................................... 9-138997

[51] Int. Cl.[7] .................................................. G09G 5/00
[52] U.S. Cl. .......................... 345/163; 345/167; 345/169; 345/157; 341/2; 341/22
[58] Field of Search ..................................... 345/163, 164, 345/165, 166, 167, 2, 157, 158, 169, 168; 341/22, 2

[56] References Cited

U.S. PATENT DOCUMENTS

| | | | |
|---|---|---|---|
| 4,430,644 | 2/1984 | Blanchard, Jr. et al. | 340/365 |
| 4,503,427 | 3/1985 | Iida | 340/731 |
| 5,903,259 | 5/1999 | Brusky et al. | 345/168 |

*Primary Examiner*—Richard A. Hjerpe
*Assistant Examiner*—Jean E. Lesperance
*Attorney, Agent, or Firm*—Brinks Hofer Gilson & Lione

[57] ABSTRACT

When the ball of a mouse is rotated, an up/down counter outputs a count N according to the direction of rotation and the amount of rotation. A controller compresses the count N to seven-bit data according to a conversion table. The controller also attaches L-button data indicating the state of the L button of the mouse to the most significant bit of the compressed seven-bit data. Then, the controller changes the bit positions of the eight-bit data, and reverses each bit value. The eight-bit data to be transferred has been thus completed. The controller sends bit by bit in series the data from a lower bit to a signal processing unit.

11 Claims, 3 Drawing Sheets

SIGNAL PROCESSING SYSTEM

BACKGROUND OF THE INVENTION

1. Field of the Invention

The present invention relates to a signal processing system in which data generated by a data input unit, such as a keyboard or a mouse, is transferred to a signal processing unit, including a personal computer, and processing according to the data is performed in the signal processing unit.

2. Description of the Related Art

As an input unit for inputting positional coordinate data which indicates the position of a cursor on the screen of a personal computer, a mouse or a trackball can be used which is provided with a ball and which changes the display position of the cursor according to the rotation direction and the amount of rotation of the ball.

FIG. 3 is a view illustrating the structure of a mechanical section of a mouse.

In this figure, a ball 1 is mounted rotatably about its center point. On the surface of the ball 1, rollers 3X and 3Y secured to rotatable shafts 2X and 2Y are pressed at two points through which the radii form 90 degrees, respectively. The direction indicated by arrow X is hereinafter called a +X direction (the reverse direction is called an −X direction) in the figure, and the direction indicated by arrow Y is hereinafter called a +Y direction (the reverse direction is called an −Y direction). At ends of the shafts 2X and 2Y, circular choppers 4X and 4Y are secured, respectively. At the peripheries of the choppers 4X and 4Y, a plurality of the same-size slits are disposed at an equal interval.

Photo-interrupters 5X and 5Y are mounted for the choppers 4X and 4Y, respectively. The photo-interrupters 5X and 5Y are provided with light-emitting devices (not shown) and light-receiving devices (not shown). The photo-interrupters 5X and 5Y are disposed against the chopper 4X and 4Y such that the peripheries of the choppers are disposed between the light-emitting devices and the light-receiving devices. The chopper 4X and the photo-interrupter 5X form an optical encoder 6X, and the chopper 4Y and the photo-interrupter 5Y form an optical encoder 6Y.

In this structure, when the ball 1 rotates, the shafts 2X and 2Y are rotated through the rollers 3X and 3Y, and the choppers 4X and 4Y are rotated accordingly. A power voltage V is applied to the photo-interrupters 5X and 5Y. The light-emitting devices are always emitting light. Therefore, when the choppers 4X and 4Y are rotated, blade-shaped portions between the slits formed at the peripheries of the choppers 4X and 4Y sequentially pass between the light-emitting devices and the light-receiving devices of the photo-interrupters 5X and 5Y. With this, light emitted from a light-emitting device to the corresponding light-receiving device is chopped and the levels of the signals $P_{XA}$, $P_{XB}$, $P_{YA}$, and $P_{YB}$ output from the light-receiving devices are changed like pulses.

FIG. 4 is a block diagram of a circuit section of the mouse.

The circuit shown in the figure is provided for each of the two optical encoders 6X and 6Y. For simplicity, one of the two circuits is taken (that for the optical encoder 6X) and will be described. The configuration and the operation of the other circuit (that for the optical encoder 6Y) is the same as those of the circuit taken.

Light-emitting diodes 8A and 8B, for example, serve as the light-emitting devices provided for the photo-interrupter 5X. Phototransistors 9A and 9B, for example, serve as the light-receiving devices provided for the photo-interrupter 5X. In order to detect the rotation direction (along the X-axis) of the ball 1, the photo-interrupter 5X is provided with two pairs of light-emitting diodes and phototransistors as shown in FIG. 4. The output pulse $P_{XA}$ of the phototransistor 9A and the output pulse $P_{XB}$ of the phototransistor 9B have different phases in terms of the rising edge of a pulse according to the rotation direction of the chopper 4X (namely, the ball 1). In other words, when the ball 1 rotates in the +X direction, the output pulse $P_{XA}$ rises earlier than the output pulse $P_{XB}$. When the ball 1 rotates in the −X direction, the output pulse $P_{XB}$ rises earlier than the output pulse $P_{XA}$.

According to the phase relationship between the output pulse $P_{XA}$ and the output pulse $P_{XB}$, a rotation-direction detector 10 detects the rotation direction of the chopper 4X. An up/down counter 9 counts the output pulses of the phototransistors. The up/down counter 9 counts in an ascending order or an descending order, depending on the rotation direction of the chopper 4X, detected by the rotation-direction detector 10. A controller 111 transfers the count N of the up/down counter 9 to the signal processing unit (not shown), such as a personal computer.

In the foregoing conventional signal processing system, when the ball 1 is rotated largely, the number of the output pulses of a light-receiving device (phototransistor) becomes large and the count of the pulses increases accordingly. Therefore, the amount of data to be transferred to the signal processing unit becomes large.

SUMMARY OF THE INVENTION

Accordingly, it is an object of the present invention to provide a signal processing system which can suppress the amount of data to be transferred.

The foregoing object is achieved in one aspect of the present invention through the provision of a signal processing system including: data generating means for generating data; compressing means for compressing the data generated by the data generating means; transmitting means for transmitting the data compressed by the compressing means; receiving means for receiving the data transmitted by the transmitting means; expanding means for expanding the data received by the receiving means; and processing means for performing certain processing according to the data expanded by the expanding means.

In the present invention, since the compressing means compresses the data generated by the data generating means, the amount of data to be transferred is suppressed to a low level.

The foregoing object is also achieved in another aspect of the present invention through the provision of a signal processing system including: data generating means for generating data having a certain number of bits; first move means for moving according to a certain rule the bit positions of the data generated by the data generating means; first reversing means for reversing each bit value of the data in which the bit positions have been moved by the first move means; transmitting means for transmitting the data in which each bit has been reversed by the first reversing means; receiving means for receiving the data transmitted by the transmitting means; second reversing means for reversing each bit of the data received by the receiving means; second move means for returning according to the reverse rule of the certain rule the bit positions of the data in which each bit has been reversed by the second reversing means; and processing means for performing certain processing according to the data in which the bit positions have been returned by the second move means.

The foregoing object is achieved in still another aspect of the present invention through the provision of a signal processing system including: data generating means for generating data having a certain number of bits; compressing means for compressing the data generated by the data generating means; first move means for moving according to a certain rule the bit positions of the data compressed by the compressing means; first reversing means for reversing each bit value of the data in which the bit positions have been moved by the first move means; transmitting means for transmitting the data in which each bit has been reversed by the first reversing means; receiving means for receiving the data transmitted by the transmitting means; second reversing means for reversing each bit of the data received by the receiving means; second move means for returning according to the reverse rule of the certain rule the bit positions of the data in which each bit has been reversed by the second reversing means; expanding means for expanding the data in which the bit positions have been returned by the second move means; and processing means for performing certain processing according to the data expanded by the expanding means.

DESCRIPTION OF THE PREFERRED EMBODIMENT

Figure 1:
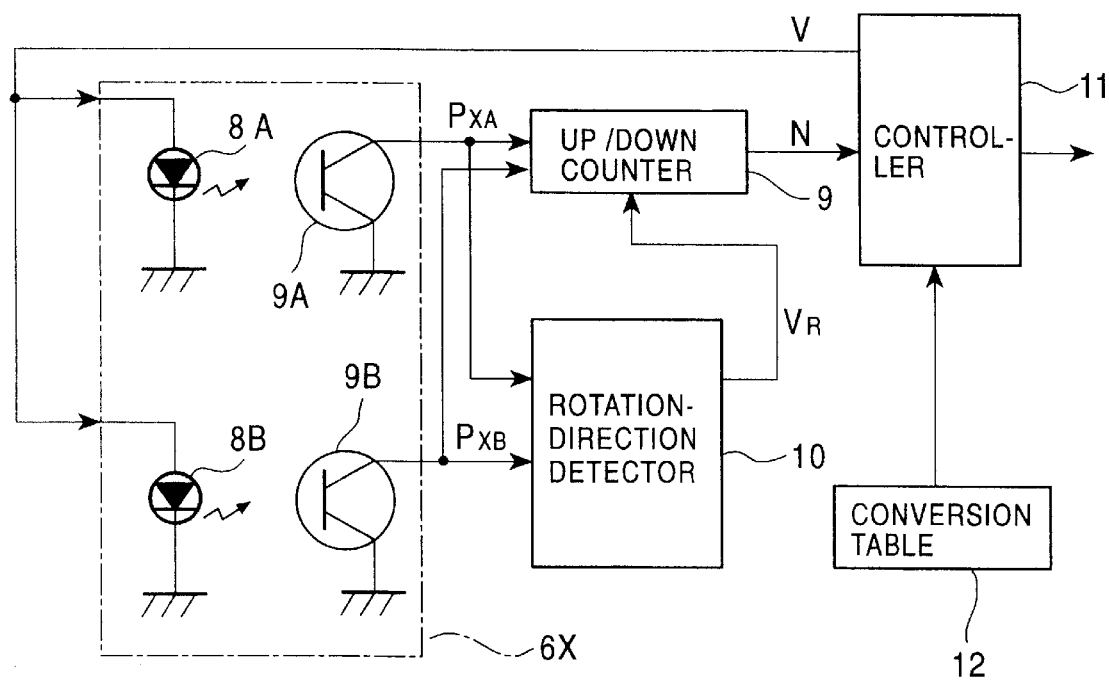
FIG. 1 is a block diagram of the circuit of an input unit (a mouse as an example) used for a signal processing system according to an embodiment of the present invention.

An embodiment of the present invention will be described below by referring to the drawings.

Figure 3:
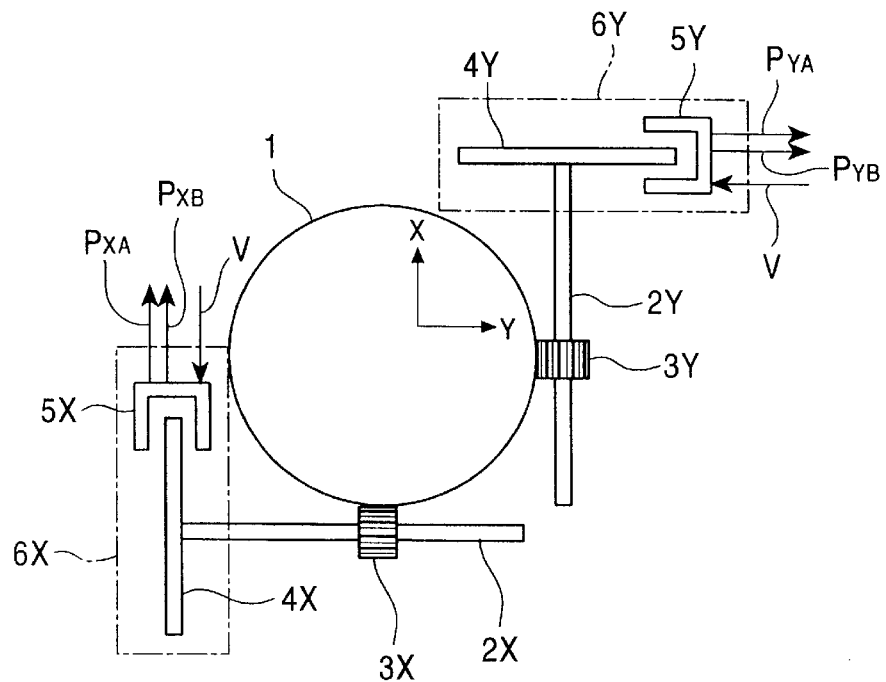
FIG. 3 is a view illustrating the structure of a mechanical section of the mouse.
Figure 4:
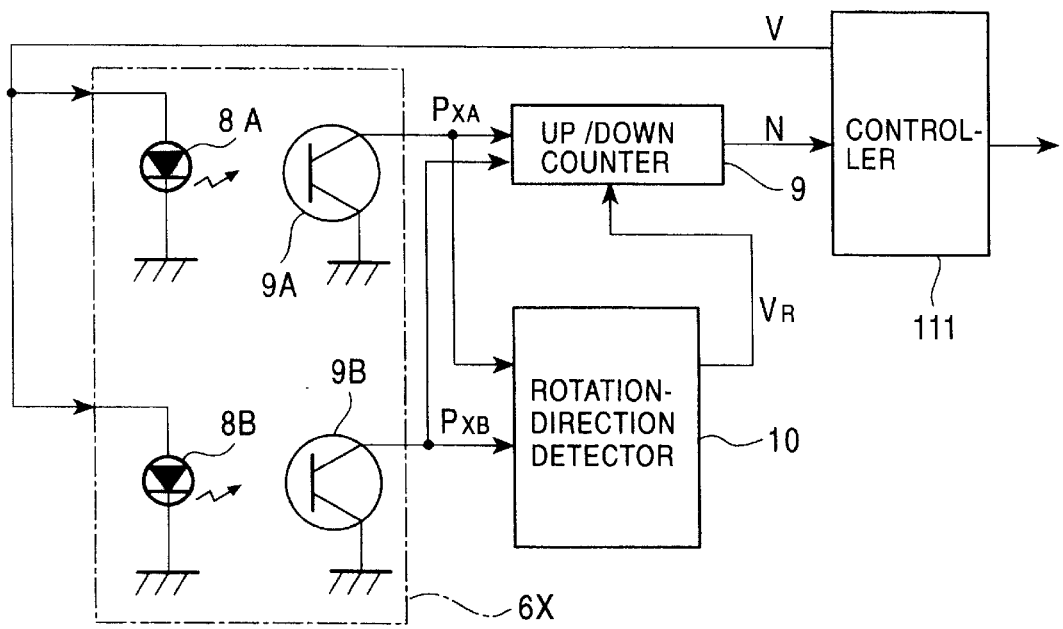
FIG. 4 is a block diagram of the circuit of a conventional mouse.

FIG. 1 is a block diagram of the circuit of an input unit (a mouse is taken as an example) used for a signal processing system according to an embodiment of the present invention. In FIG. 1, the same symbols as those used in FIG. 4 are assigned to the portions corresponding to those in FIG. 4, and the descriptions thereof will be omitted. It is assumed that the mechanical structure of the mouse is the same as that shown in FIG. 3.

The circuit shown in the figure is provided for each of two optical encoders 6X and 6Y. For simplicity, one of the two circuits is taken (that for the optical encoder 6X) and will be described. The configuration and the operation of the other circuit (that for the optical encoder 6Y) is the same as those of the circuit to be described.

In this figure, a conversion table 12 is stored in a nonvolatile IC memory (such as ROM or RAM to which a power is supplied from a battery).

Figure 2:
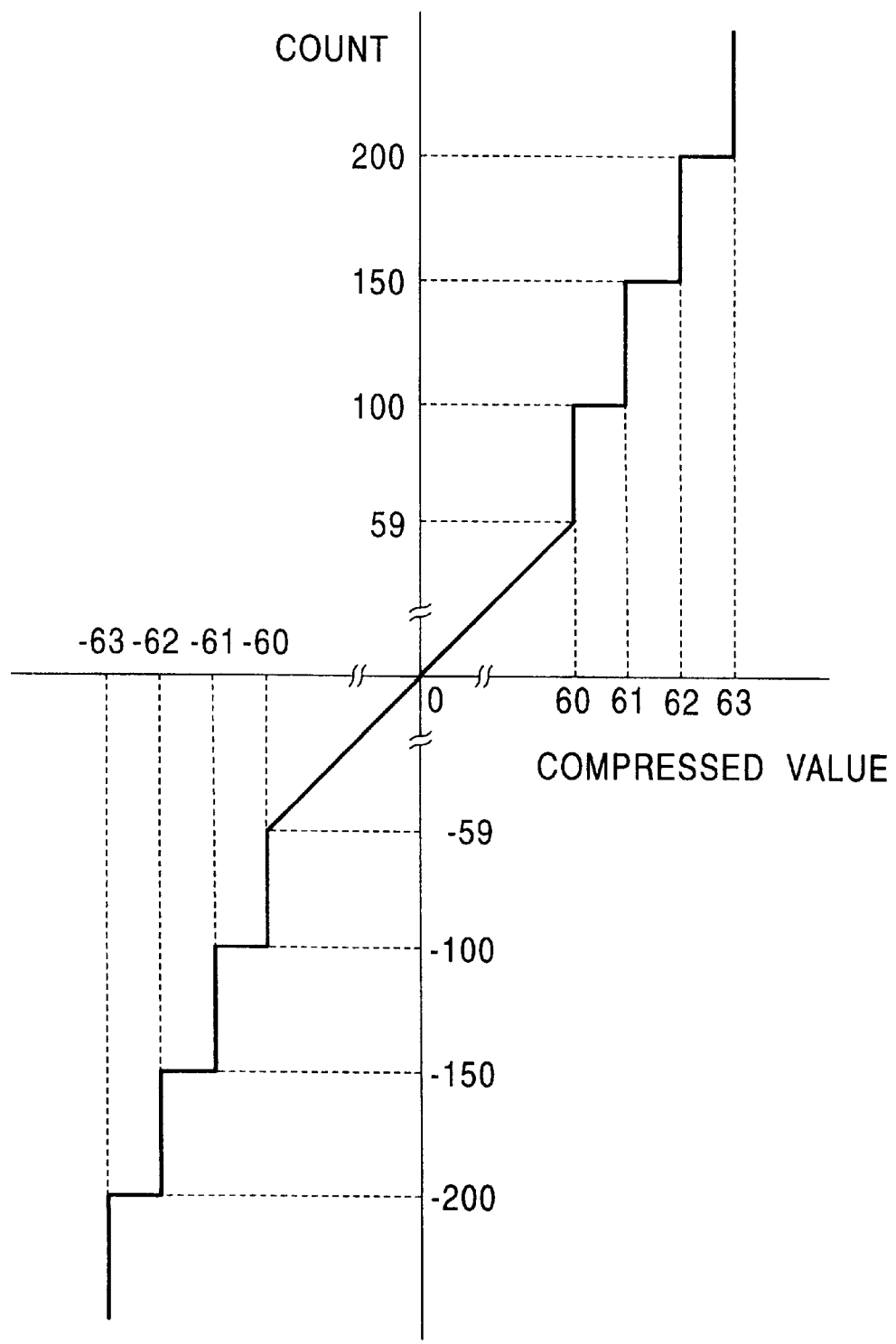
FIG. 2 is a view showing a way in which a conversion table 12 works.

FIG. 2 is a view showing a way in which the conversion table 12 works.

The operation of the signal processing system having the above structure will be described below.

When a ball 1 is rotated, an up/down counter 9 outputs a count N according to the rotation direction and the amount of rotation, in the same way as in the conventional technology.

A controller 11 compresses the count N to seven-bit data (−63 to +63) according to the conversion table 12 (FIG. 2).

In other words, the controller 11 compresses a count N not more than −200 to −63, a count N ranging from −199 to −150 to −62, a count N ranging from −149 to −100 to −61, and a count N ranging from −99 to −59 to −60. The controller 11 uses a count N ranging from −58 to 58 as is as a compressed value. The controller 11 compresses a count N ranging from 59 to 99 to 60, a count N from 100 to 149 to 61, a count N from 150 to 199 to 62, and a count N not less than 200 to 63.

The controller 11 next attaches L-button data indicating the current state (ON or OFF) of an L button (not shown) of the input unit (namely, the mouse) to the most significant bit (MSB) of the compressed seven-bit data. The L-button data has one bit, and becomes "0" when the L button is ON and becomes "1" when the L button is OFF. The data becomes eight bit long.

Then, the controller 11 changes the positions of the bits of the above eight-bit data. Specifically, the controller 11 moves the bit-0 data to the position of bit 7, the bit-1 data to the position of bit 6, the bit-2 data to the position of bit 5, the bit-3 data to the position of bit 4, the bit-4 data to the position of bit 3, the bit-5 data to the position of bit 2, the bit-6 data to the position of bit 1, and the bit-7 data to the position of bit 0. With this move operation, the L-button data is moved from the MSB to the least significant bit (LSB).

The controller 11 reverses each bit of the eight-bit data in which the bits have been moved. In other words, the controller 11 changes each bit from "1" to "0" or from "0" to "1." With this operation, the L-button data is "1" when the L button is ON and is "0" when the L button is OFF.

The data to be transferred has been thus completed.

The controller 11 sends in series the data to be transferred bit by bit from a lower bit to a signal processing unit (not shown), such as a personal computer.

When the signal processing unit receives the data, it applies the reverse operations of those applied by the controller 11 to the data to obtain the original count.

When compressed seven-bit data is expanded, however, it is impossible to obtain the complete original count N from the seven-bit data (−63 to +63). The signal processing unit sets the original count to −200 when the seven-bit data is −63, to −150 when the seven-bit data is −62, and to −100 when the seven-bit data is −61. When the seven-bit data ranges from −60 to 60, the signal processing unit regards the data as the original count. The signal processing unit sets the original count to 100 when the seven-bit data is 61, to 150 when the seven-bit data is 62, and to 200 when the seven-bit data is 63.

The operation of the signal processing system has been described.

When serial transfer is performed by optical communication, a bit transferred later is likely to generate a transfer error due to a change with time in the amount of transfer light. Therefore, in the conventional signal processing system in which a lower bit is transferred earlier in data to be transferred, when switch data (such as the L-button data) is positioned at the MSB of the data to be transferred, a transfer error of the switch data is likely to occur. In this case, since the display coordinates of a cursor become disorganized after the on/off state of the button is not properly indicated, the user is convinced that an error has occurred due to an erroneous operation by the user and may be unaware of a transfer error. Conversely, in the present system, since the switch data is moved to the LSB, where a transfer error is most unlikely to occur, a transfer error of the switch data is unlikely to occur. In addition, even if a transfer error occurs, since the display coordinates of the cursor become disorganized before a wrong button state is indicated, the user can be aware of a unit malfunction immediately.

A specific structure of a signal processing system according to the present invention is not limited to that shown in the foregoing embodiment. A design modification within the spirit and scope of the present invention is also allowed.

In the above-described embodiment, the count is compressed according to the conversion table shown in FIG. 2. Compression may be performed according to other rules.

The mouse is taken as an example of the input unit in the foregoing embodiment. The input unit is not limited to the mouse. The present invention can also be applied to a signal processing system having other input units, such as a trackball and keyboard.

What is claimed is:

1. A signal processing system comprising:

data generating means for generating data having a certain number of bits;

first move means for moving according to a certain rule the bit positions of the data generated by said data generating means;

first reversing means for reversing each bit value of the data in which the bit positions have been moved by said first move means;

transmitting means for transmitting the data in which each bit has been reversed by said first reversing means;

receiving means for receiving the data transmitted by said transmitting means;

second reversing means for reversing each bit of the data received by said receiving means;

second move means for returning according to the reverse rule of said certain rule the bit positions of the data in which each bit has been reversed by said second reversing means; and processing means for performing certain processing according to the data in which the bit positions have been returned by said second move means.

2. A signal processing system according to claim 1, further comprising memory means for storing the relationship between the data before compression and the compressed data, wherein said compressing means compresses according to said relationship the data generated by said data generating means.

3. A signal processing system according to claim 1, wherein said transmitting means and said receiving means perform transmission and receiving by the use of optical communication.

4. A signal processing system according to claim 3, wherein the data generated by said data generating means includes switch data which specifies the execution of said processing;

said first move means moves said switch data to the least significant bit; and said transmitting means transmits in series from a lower bit the data in which each bit value has been reversed by said first reversing means.

5. A signal processing system according to claim 1, wherein said data generating means includes pulse generating means for generating the number of pulses corresponding to the amount of a certain operation; and counting means for counting the pulses generated by said pulse generating means and for outputting the count as said data.

6. A signal processing system comprising:

data generating means for generating data having a certain number of bits;

compressing means for compressing the data generated by said data generating means;

first move means for moving according to a certain rule the bit positions of the data compressed by said compressing means;

first reversing means for reversing each bit value of the data in which the bit positions have been moved by said first move means;

transmitting means for transmitting the data in which each bit has been reversed by said first reversing means;

receiving means for receiving the data transmitted by said transmitting means;

second reversing means for reversing each bit of the data received by said receiving means;

second move means for returning according to the reverse rule of said certain rule the bit positions of the data in which each bit has been reversed by said second reversing means;

expanding means for expanding the data in which the bit positions have been returned by said second move means; and processing means for performing certain processing according to the data expanded by said expanding means.

7. A signal processing system according to claim 6, wherein said data generating means includes pulse generating means for generating the number of pulses corresponding to the amount of a certain operation; and counting means for counting the pulses generated by said pulse generating means and for outputting the count as said data.

8. A signal processing system according to claim 7, wherein said amount of a certain operation is a move distance in a certain coordinate system.

9. A signal processing system according to claim 6, wherein said transmitting means and said receiving means perform transmission and receiving by the use of optical communication.

10. A signal processing system according to claim 6, further comprising memory means for storing the relationship between the data before compression and the compressed data, wherein said compressing means compresses according to said relationship the data generated by said data generating means.

11. A signal processing system according to claim 6, wherein said transmitting means and said receiving means perform transmission and receiving by the use of optical communication;

wherein the data generated by said data generating means includes switch data which specifies the execution of said processing;

said first move means moves said switch data to the least significant bit; and said transmitting means transmits in series from a lower bit the data in which each bit value has been reversed by said first reversing means.

* * * * *